July 9, 1929.  R. D. BURTS  1,719,871
HARVESTER FOR PEANUTS AND OTHER PLANTS
Filed March 22, 1923   5 Sheets-Sheet 1

Inventor
Reubin D. Burts,
by
Attorney

July 9, 1929.  R. D. BURTS  1,719,871
HARVESTER FOR PEANUTS AND OTHER PLANTS
Filed March 22, 1923  5 Sheets-Sheet 4

Inventor
Reubin D. Burts,
by
Attorney

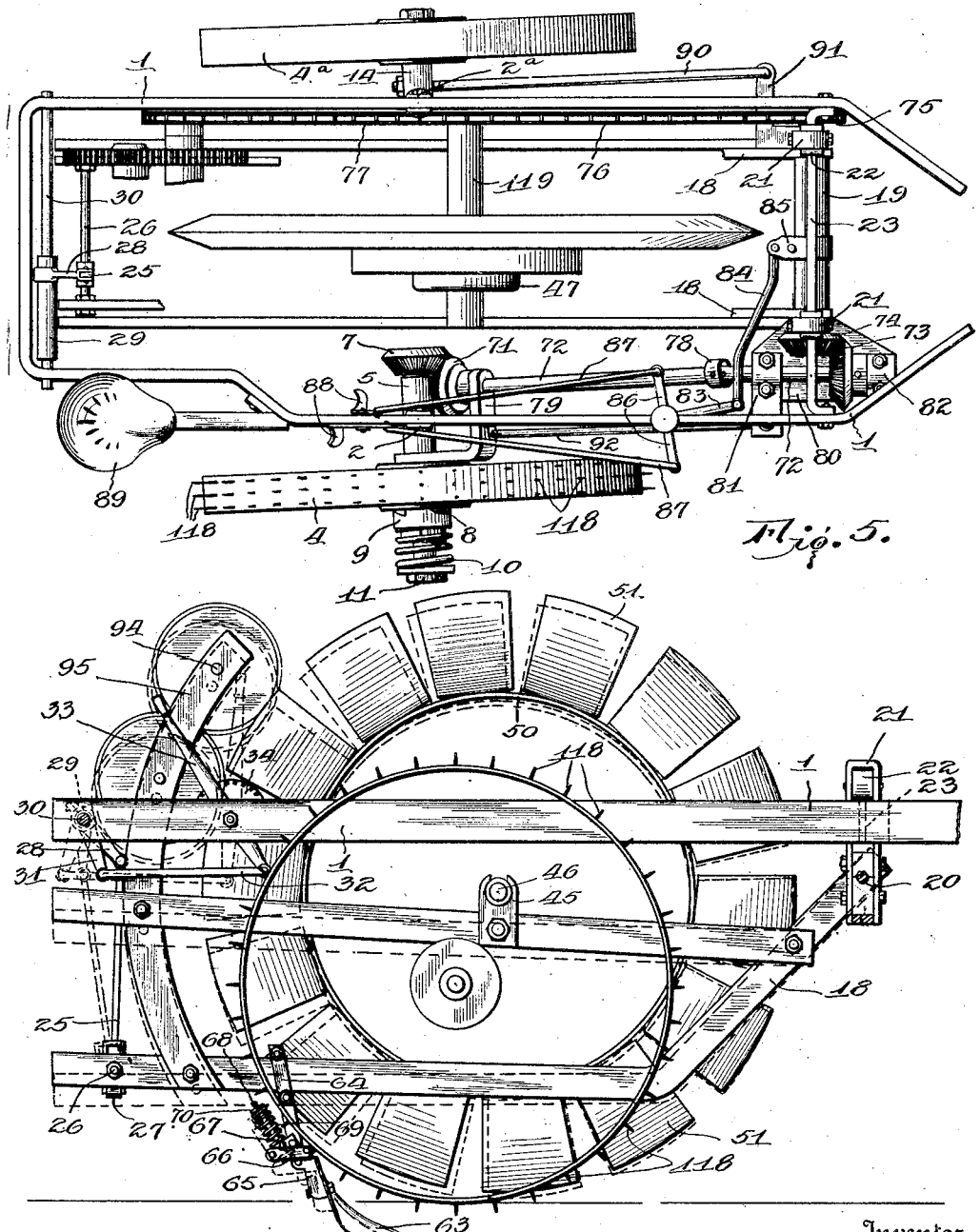

Patented July 9, 1929.

1,719,871

UNITED STATES PATENT OFFICE.

REUBIN D. BURTS, OF SYLVESTER, GEORGIA.

HARVESTER FOR PEANUTS AND OTHER PLANTS.

Application filed March 22, 1923. Serial No. 626,957.

My invention relates to a machine designed more particularly for harvesting peanuts, but not confined to that use when adapted for other uses.

It has for its object to construct a machine wherein the gathering wheel may be swung or adjusted laterally to keep in line with the rows of peanut vines and the traction-wheels may also be kept parallel to the vine rows although the row of vines may be irregular or curved in line instead of straight and thus the gathering wheel grippers are always presented in proper relation to the vines to grasp the vines for lifting them from the ground and the traction wheels are prevented from traveling or running on top of the vines in the travel of the machine. It has also for its object to provide for delivering the harvested vines into a receiving receptacle wherein the vines will be laid substantially or practically in a flat spread-out position, one on top of another, instead of in a tangled or indiscriminate fashion or manner, thus forming a pile when discharged from the receiver with the vines in the best position for further handling and threshing. It has also for its object to provide improved means for raising and lowering the frame carrying the gathering wheel and the plow to suit the conditions of the plants at the time of harvesting, and also to bring the manipulation of the various parts under ready, easy and convenient control of the operator.

Figure 1:
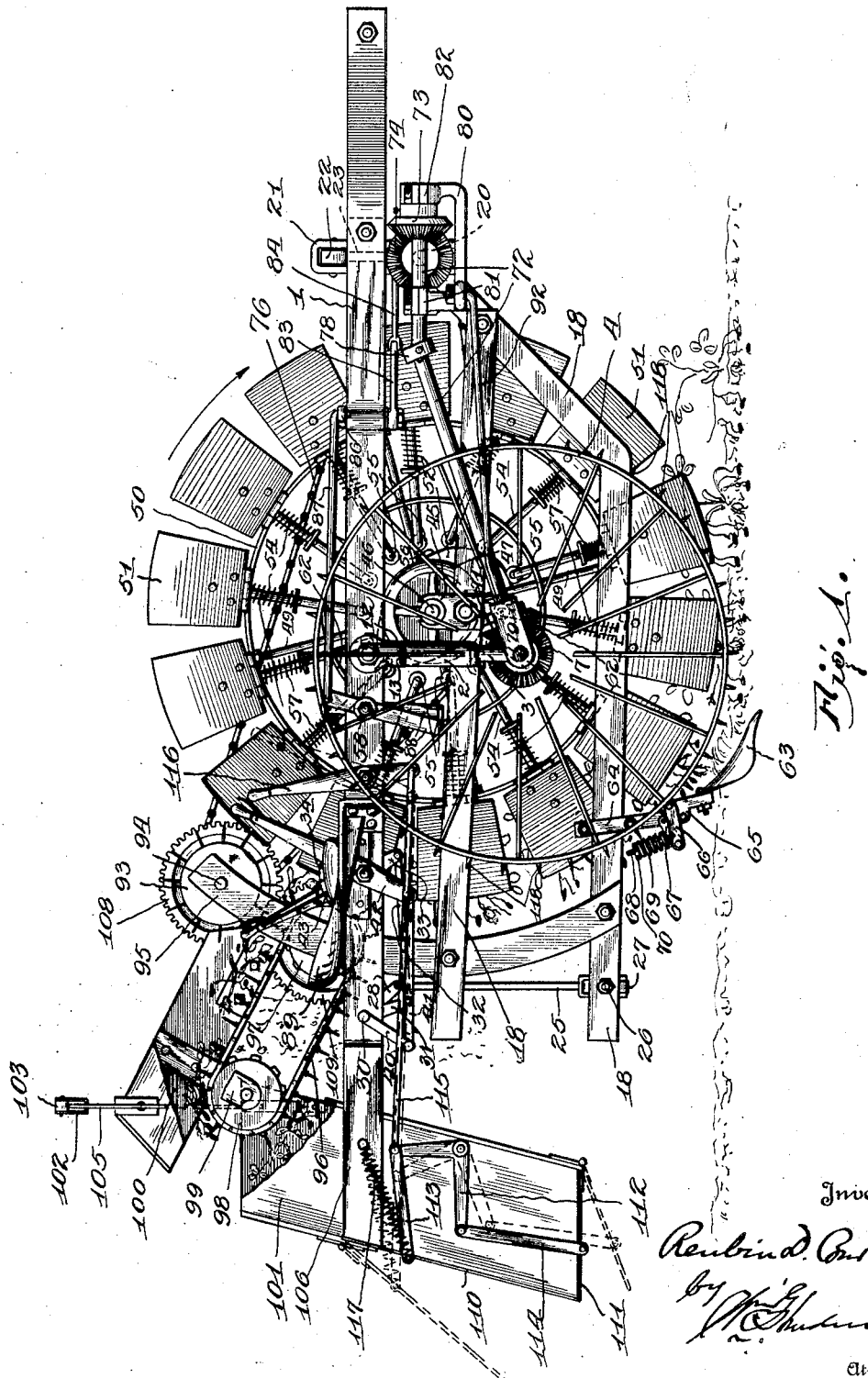
Figure 2:
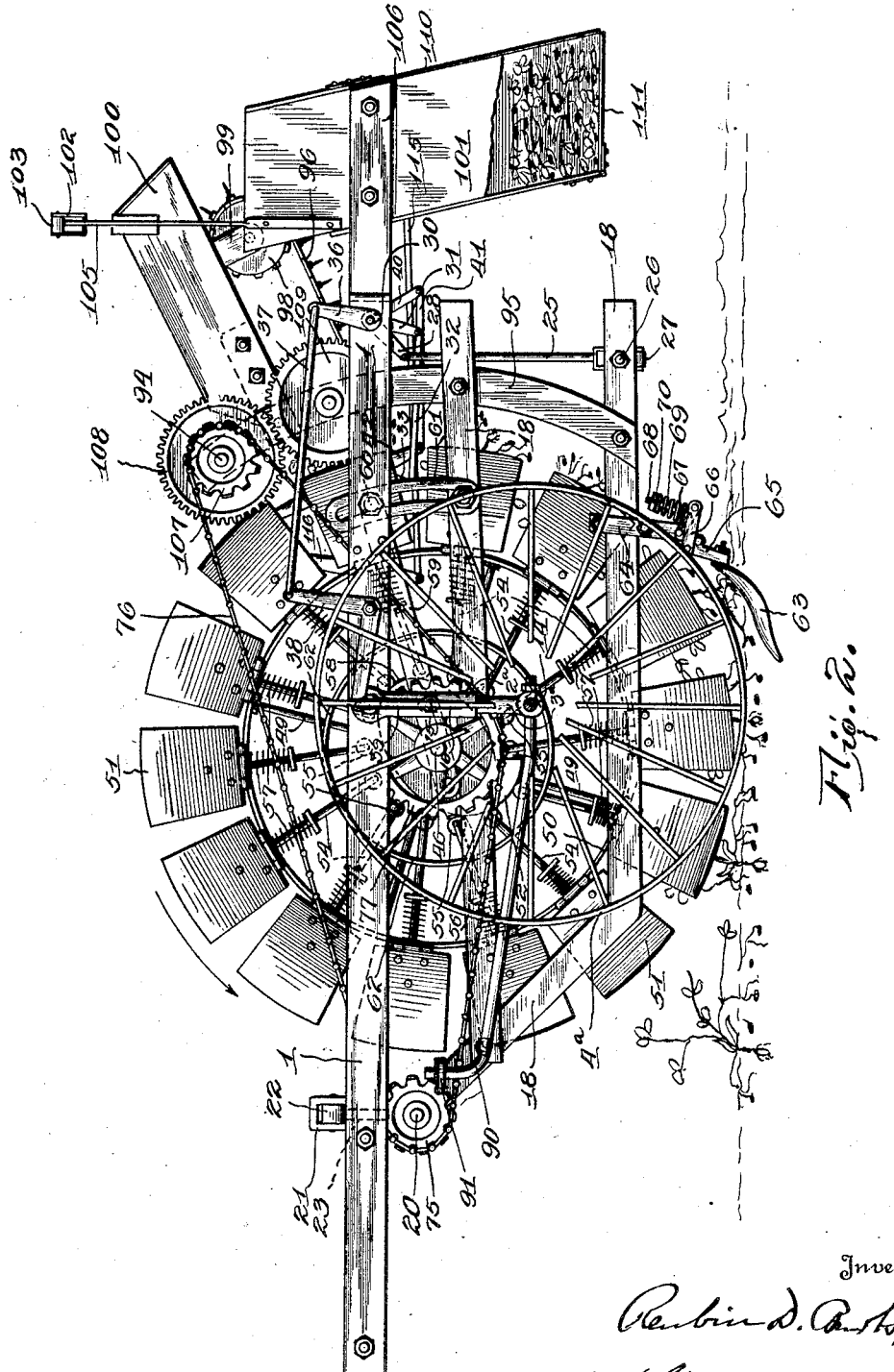
Figure 3:
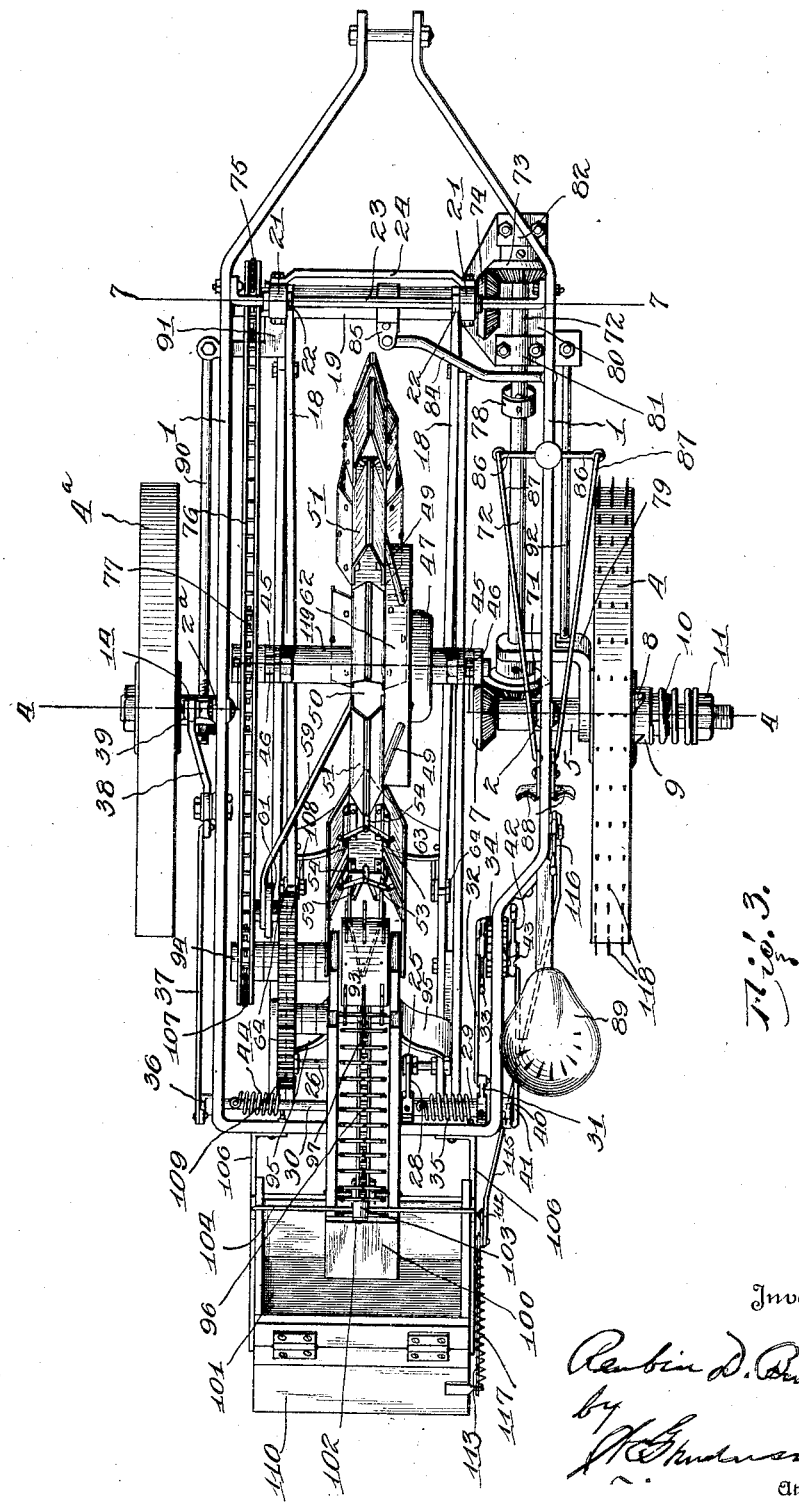
Figures 4, 7:
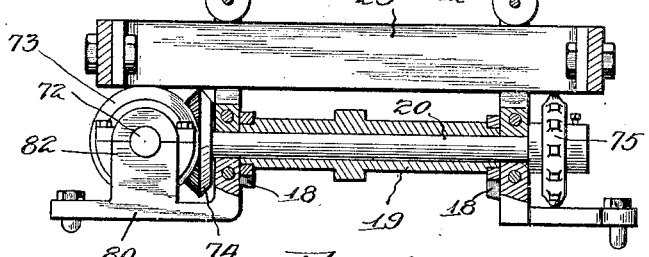

To the accomplishment of the foregoing and such other objects as may hereinafter be made to appear, the invention consists in the construction and the combination of various parts hereinafter more particularly described and then sought to be clearly defined by the claims, reference being had to the accompanying drawings forming a part hereof, and in which Figure 1 is a side elevation of the harvester;

Figure 2 is a side elevation, from the opposite side;

Figure 3 a top plan view;

Figure 4 a front elevation, partly in vertical cross section on line 4—4 of Figure 3;

Figure 5 a plan view, with parts omitted, showing the auxiliary frame shifted and traction wheels oblique to the longitudinal axis of main frame;

Figure 6 a side view of the gatherer wheel and some parts with others omitted;

Figure 7 a detail view, partly in section, on an enlarged scale, of the forward end of auxiliary frame and cross rail or track.

In the drawings the numeral 1 designates a main frame supported on upright standards 2 and $2^a$, preferably tubular, and mounted upon upright spindles 3 and $3^a$ which at their lower ends are connected with the traction wheels 4 and $4^a$ so that said wheels serve to support the whole super-structure. The lower end of standard 2 has a boxing 5 in which is rotatably mounted a shaft 6 which carries a bevel gear 7 at one end and upon which also is freely mounted the traction wheel 4 upon the hub of which is a pin 8 that engages with the teeth of a clutch collar 9 keyed to the shaft 6 and under the influence of a spring 10, the tension of which may be regulated by a nut 11, so that in the forward movement of the wheel the shaft 6 will be rotated while in the backward movement the wheel will turn without rotating the shaft 6. The spindle 3 has a pin 12 which passes through a transverse slot 13 made in the standard so as to permit a restricted rotatable movement between the standard and the spindle 3. The lower end of spindle $3^a$ has an outwardly extending axle 14 on which the wheel $4^a$ is mounted so as to turn thereon, and the spindle $3^a$ has a laterally extending stud or pin 15 fitting in a vertically extending slot 16 in the standard $2^a$ so as to permit the spindle and standard to have a vertical movement relatively one to the other so as to compensate for irregularities in the ground over which the harvester travels and thus obtain an adjustment that will enable the superstructure of the harvester to be maintained in a substantially horizontal plane. The slot 16 in the standard $2^a$ is also of sufficient width to permit a restricted rotatable movement between the standard and spindle $3^a$.

From the main frame 1 there is hung or suspended an auxiliary frame that carries the gathering wheel and plow and associated operating parts and which is suspended in a manner to be given a lateral movement or swing to keep the gathering wheel in line with the row of vines, and also a vertical or tilting movement to lift or drop the harvesting wheel and also the plow out of or into operative relation to the peanut vines or plants. This auxiliary frame preferably comprises or is made up of oppositely disposed connected together side members 18, the forward ends of the side members being spaced apart by a sleeve 19 through which passes a shaft 20, and from the ends of the side members extend upwardly yokes 21 having friction rollers 22 resting upon a cross bar or rail 23 which extends from one side to the other of the main frame 1, and for bracing purposes one yoke is connected to the other by a brace-bar 24, and thus the forward end of the auxiliary frame is slidably supported from the main frame. The rear end of the auxiliary frame is suspended by a link 25 connected at one end to a cross rod 26, extending from one side member to the other of the frame 18, by a roller support 27 permitting the auxiliary frame to slide sideways on the roller support, the other end of the link being connected to a crank-arm 28 connected to a sleeve 29 mounted on a cross shaft 30 connecting one side of the main frame to the other side and the sleeve 29 having another crank-arm 31 attached to it to which is pivotally connected one end of a link 32 the other end of which is pivotally connected to a lever 33 pivotally supported from the main frame and which will be provided with any well known form of spring-latch to engage a toothed segment 34 to hold the lever to its adjustment. The sleeve 29 is revoluble and may be under the influence of a spring 35. Through the means described the auxiliary frame with the elements carried by it may be lifted so as to regulate the depth of cut of the plow and elevation of the gatherer wheel hereinafter described, or for raising the same out of operative positions in relation to the ground in transportation of the harvester, the auxiliary frame in such adjustments turning or swinging on the shaft 20.

In running over uneven or sloping ground, the superstructure of the harvester is brought to a substantially horizontal position so that the gatherer wheel and plow will efficiently function by the following devices. On one end of the revoluble shaft 30 is a crank-arm 36 connected by a link 37 with a bell-crank lever 38 one arm of which is pivotally connected to a link 39 the other end of which is pivotally connected to the pin or stud 15 projecting from the spindle $3^a$ of the ground or traction wheel $4^a$, and to the opposite end of shaft 30 is a crank-arm 40 which is connected by a rod or link 41 to a lever 42 which will have a spring-latch of any well known form for locking engagement with a toothed segment 43. By movement of the lever in one direction the side of the main frame next to the spindle $3^a$ will be lowered so that if the other side of the frame has dropped by its ground wheel running on the down slope of the ground the main frame will be brought into substantially a horizontal plane, while on the other hand if the side next to the spindle $3^a$ drops by reason of the ground wheel at that side running on the down slope of the ground, a movement of the lever 42 in the opposite direction will raise that side so that the main frame will be brought to a substantially horizontal plane. An equalizing spring 44 which may have one end attached to the revoluble shaft 30 and the other end to a fixed part of the frame and preferably normally under tension will assist in restoring the lowered side of the frame to normal position when the lever 42 is moved in the proper direction, and also serves to equalize or balance the main frame.

The gathering wheel is journaled centrally between the side members of the auxiliary frame 18 in suitable boxings 45. It comprises a shaft 46 journaled in said boxings, a hub 47 secured to the shaft by a set screw 48, or otherwise, to rotate with the shaft, spokes 49 connecting a rim 50 to the hub, gripping fingers or jaws 51 located at the wheel rim, and a cam 52 for timing the opening and closing of the fingers in gathering the peanut vines and delivering them to a receiving receptacle. Each jaw or finger comprises two oppositely disposed hinged members 51 connected by links 53 to a rod or stem 54 one end of which carries a friction roller 55 bearing against the face of cam 52 which is formed so as to open and close the jaws at the proper time to grasp the peanut vines to pull them from the ground and again open them at the proper time to release the vines to be taken by proper devices from the gathering wheel and delivered to the receptacle provided for that purpose. The jaws begin to open in the rotation of the gathering wheel at the point where the roller end of the stems comes into contact with the swell 56 of the cam which continues the opening or spreading apart of the jaws until the roller end of the spreader stem 54 leaves the highest point of the swell at which point a spring 57 encircling the stem and which has been compressed during the travel of the stem expands and retracts the stem so as to close the jaws which grip the vine and lift the same in the continued rotation of the wheel until the stems in succession reach the swell 58 which presses the stem outward so as to open the jaws at the point where the vines will be moved away from the jaws by means provided for the purpose, and as the stem leaves the swell 58 the recoil of the spring will retract the stem and close the jaws until they again reach the swell 56 whereupon the cycle of operation is repeated. The cam 52 is rotatable on shaft 46 and may be shifted rotatably thereon by suitable means, for instance by an arm 59 which may be held to its adjusted position so as to hold the cam to its adjustment by a bolt and nut 60 to a slotted bracket 61, or otherwise. This adjustment is provided for as it sometimes is desirable to change the time of opening and closing the gripping jaws of the gathering wheel depending on the spacing or other conditions of the vines, and thus provision is made for this timing for opening and closing the jaws. The jaw spreading stems 54 are guided in their sliding movements by an annular band 62 through which they pass; and the gathering wheel spokes 49 also pass through this band as shown. The plow for digging or uprooting the peanuts is designated by the numeral 63 and is supported from the lower sides of the frame 18 by brackets 64 in a manner to permit the plow to yield under an excess of strain, for instance by pivoting the plow shanks 65 to the brackets 64 and pivotally connecting links 66 at one end to the plow shanks and at the other end to arms 67 extending from the brackets and pivoting bolts 68 to the links 66, which bolts are encircled by springs 69 bearing at one end against arms 67 and at the other end against nuts 70 on the bolts so that when the plow is forced backward it will be against the resistance of the coil springs and when the excess pressure is relieved the plow will be restored to normal by the springs.

The gatherer wheel is driven or rotated from shaft 6 of traction wheel 4 by bevel gear 7 of shaft 6 meshing with bevel-gear 71 on transmission shaft 72 having a bevel-gear 73 at its other end which meshes with a bevel-gear 74 on the shaft 20 which at one end has a sprocket-wheel 75 from which a drive-chain 76 passes and engages a sprocket-wheel 77 mounted on the end of shaft 46 to which the hub of the gatherer wheel is keyed or fastened. The transmission shaft 72 is made in two parts connected together by a gimbal-joint 78, or its equivalent, and is supported in suitable brackets and boxes, for instance by bracket 79 and a bracket 80 having boxings 81 and 82. The joint in the transmission shaft 72 permits oscillatory movement of the wheel axle 6 in a horizontal plane without throwing the bevel gears 7 and 71 out of mesh and also relieves the parts of strain in shifting the auxiliary frame from side to side as hereinafter described.

Not all rows of plants or vines are regular or straight in length; accordingly provision is made for shifting laterally or sideways the auxiliary frame carrying the gatherer wheel so that the gripping jaws of the wheel shall be brought into alinement with the vines to be gathered. This is effected in the preferred form by connecting a rocking lever 83 by a link 84 and strap 85, or otherwise, with the spacing sleeve 19 at the front end of the auxiliary frame and attaching to oppositely extending arms 86 the lever rods 87 which at their other ends are pivotally attached to foot levers 88 which may be pivoted or fulcrumed to a side member of the main frame and within convenient reach of the operator who will occupy the seat 89. By pressing on one foot pedal lever 88, or the other as may be, the rocking-lever 83 through the connecting link 84 will shift the auxiliary frame sideways whose yokes will slide on rail 23, and stirrup 25 slide along the transverse rod 26, so as to bring the gatherer wheel into alinement with the row of vines where the same departs from a straight line. At the time that the auxiliary frame is shifted the traction wheels 4 and 4ª are moved from parallelism with the frame to an oblique angle thereto, for instance as illustrated in Figure 5 of the drawing. This is effected by a rod 90 connecting the axle of wheel 4ª with the auxiliary frame through a bracket 91, or otherwise, and connecting the wheel 4 with the auxiliary frame by means of a rod 92 attached at one end to the bracket 79 and at the other end to bracket 80, or otherwise. This shifting of the wheels along with the shifting of the auxiliary frame causes the harvester ground wheels to keep between the rows of vines in following the irregular line of the rows, and also makes it possible for the operator to more quickly shift the gatherer wheel to alinement with the row than would be if directing the line of travel was dependent on guiding the draft animal of the harvester.

The peanut vines carried up by the gripping jaws to the point of discharge are engaged by a rotating toothed wheel 93 on a shaft 94 journaled in brackets 95 and by that wheel delivered to a traveling toothed belt 96 passing around a pulley 97 journaled in the brackets 95 and a pulley 98 journaled in brackets 99 depending from a guiding trough 100 pivoted at one end to the brackets 95 and suspended in an inclined position above the open upper end of a receiving receptacle or box 101 by a hanger 102 having a roller 103 capable of traveling on a cross rod 104 connecting the uprights 105 rising from the receptacle or box 101 which is supported by arms 106 extending from the rear of the main frame of the harvester. The shaft of the pick or feed roll 93 has a sprocket wheel 107 around which passes the drive chain 76 and also a toothed wheel 108 which meshes with a toothed wheel 109 on the shaft of pulley 97 so as to drive the carrier belt 96. The peanut vines delivered to the carrier belt 96 are carried up the guide trough 100 and discharged from the upper end of the trough into the receiving box or receptacle 101 into which they are deposited one upon the other in a spread-out or substantially flat position making a stack of superimposed layers of vines without being in a tangled-up mass. By suspending the upper end of trough 100 by the traveling hanger the trough may follow the side-wise movement of the auxiliary frame in its lateral adjustments and thus the vines will be properly deposited in the box 101. This box has a hinged side door 110 and a hinged bottom 111 for the discharge of the pile or stack of vines from the box 101. The doors are simultaneously opened by means of an elbow lever 112 pivoted to the side of box 101 and having one arm connected by a link 113 to the door 110 and the other arm connected by a link 114 to the door 111. The elbow lever is actuated for opening the doors by a rod 115 connected to one arm of the elbow lever and at the other end connected to a hand lever 116 fulcrumed to the side of the main frame. The two doors are closed by a spring 117 connected at one end to the arm 106 and at the other end to the link 113, said spring being distended when the two doors are opened and its recoil closing both doors through the elbow lever and links when the hand lever 116 is released or moved to closing position.

The traction wheel 4 may have teeth or studs 118 on its tread to increase the traction; and a spacing sleeve 119 may be fitted to the shaft 46 to aid in positioning the cam 52 on the shaft.

The operation and functioning of the various parts will be clear from the description given without a repetition, and while I have described and shown with some particularity the details of construction of different parts it is obvious and will be understood that changes can be made in details without departing from essential features of the invention.

Having described my invention and set forth its merits what I claim is:

1. A vine harvester comprising a rotatable gatherer wheel provided with jaws for gripping the plants, means for timing the opening and closing of the jaws to grip and release the plants, means for shifting the gatherer wheel laterally to aline its jaws with the plants, traction wheels, and means for shifting the traction wheels obliquely as the gatherer wheel is shifted laterally.

2. A vine harvester comprising a main and an auxiliary frame one movable laterally in relation to the other, traction wheels supporting the main frame and mounted to permit horizontal rotatable movement of the wheels in the lateral movement of one frame to the other, a rotatable gatherer wheel mounted on the auxiliary frame and provided with jaws for gripping the plants, and means for timing the opening and closing of the jaws to grip and release the plants in the rotation of the gatherer wheel.

3. In a vine harvester, an auxiliary frame, a rotatable gatherer wheel supported by said frame and provided with jaws for gripping the plants, a cam operatively connected with the jaws to time their opening and closing to grip and release the plants, a main frame from which the auxiliary frame is supported, traction wheels for the main frame one of which may turn in a horizontal plane and has associated therewith a gear driven from the wheel, a power transmission shaft having a gear meshing with the aforementioned gear and provided with a second gear, a rotatable shaft provided with a gear meshing with the said second gear, and means connecting said shaft with the rotatable gatherer wheel, whereby said wheel may be driven from the traction wheel in different horizontally disposed positions of the traction wheel.

4. A vine harvester comprising an auxiliary frame, a rotatable gatherer wheel supported by said frame and provided with jaws for gripping the plants, a cam operatively connected with the jaws for timing their opening and closing to grip and release the plants, a main frame from which the auxiliary frame is supported, one frame having a lateral movement in relation to the other, traction wheels supporting the main frame and mounted to permit horizontal rotatable movement of the wheels, power transmission means connecting one traction wheel with the gatherer wheel, and means connecting one traction wheel with the other for changing the horizontal disposition of the wheels.

5. A vine harvester comprising a main frame, traction wheels, an auxiliary frame hinged to swing from one end of the main frame and slidable along a rail at the same end of the main frame, a rod supporting the rear end of the auxiliary frame with which said frame is slidably connected, means for vertically adjusting the frame through said rod, a rotatable gatherer wheel provided with jaws for gripping the plants, a cam operatively connected with the jaws for timing their opening and closing to grip and release the plants, power transmission means carried by the auxiliary frame and driving the rotating gatherer wheel from one traction wheel, and means for moving the auxiliary frame laterally in relation to the main frame.

6. A vine harvester comprising an auxiliary frame supporting a gatherer wheel provided with jaws to grip the plants, and means for timing the opening and closing of the jaws to grip and release the plants, and a main frame having traction wheels, said wheels being connected with upright spindles rotatably mounted in upright tubular standards to which the main frame is attached, one of the spindles and standards having a vertically slidable relation one to the other, a lever connecting the main frame and said spindle, a crank-shaft, a connecting rod between said lever and crank-shaft, an operating lever connected with the crank-shaft for actuating the lever connected with the wheel spindle to raise and lower the main frame to accommodate it to irregular ground, and an equalizing spring to facilitate the operation of the lifting levers.

7. In a vine harvester including a plant gatherer and means to withdraw plants from the gatherer; a traveling conveyor to convey plants delivered from the gatherer; a guide trough for plants on the conveyor, a receptacle to receive the plants carried by the conveyor, and means for slidably supporting the outer end of the guide trough above the open top of the receiving receptacle.

In testimony whereof I affix my signature.

R. D. BURTS.